(12) United States Patent
Raksha et al.

(10) Patent No.: US 7,717,038 B2
(45) Date of Patent: May 18, 2010

(54) MAGNETIC PLATE FOR PRINTING OF OPTICAL EFFECTS

(75) Inventors: Vladimir P. Raksha, Santa Rosa, CA (US); Jay M. Holman, Santa Rosa, CA (US); Paul G. Coombs, Santa Rosa, CA (US); Neil Teitelbaum, Ottawa (CA); Charles T. Markantes, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 560 days.

(21) Appl. No.: 11/560,927

(22) Filed: Nov. 17, 2006

(65) Prior Publication Data

US 2007/0115337 A1 May 24, 2007

Related U.S. Application Data

(60) Provisional application No. 60/737,926, filed on Nov. 18, 2005.

(51) Int. Cl.
*B41C 3/08* (2006.01)
*B41G 7/00* (2006.01)
*B41N 6/00* (2006.01)
*H01F 7/00* (2006.01)
*H01F 1/00* (2006.01)
*H01F 3/00* (2006.01)

(52) U.S. Cl. .............. 101/401.1; 101/368; 335/219; 335/296; 335/303

(58) Field of Classification Search ............. 101/368, 101/389.1, 395, 401.1; 118/623, 624, 640; 148/103; 335/219, 296, 303; 346/74.2, 74.3
See application file for complete search history.

(56) References Cited

U.S. PATENT DOCUMENTS

| 3,683,382 A | * | 8/1972 | Ballinger | 346/74.3 |
| 3,845,499 A | * | 10/1974 | Ballinger | 346/74.3 |
| 3,853,676 A |   | 12/1974 | Graves    | 428/207  |
| 4,244,998 A |   | 1/1981  | Smith     |          |
| 5,317,340 A | * | 5/1994  | Mody      | 346/74.3 |

(Continued)

FOREIGN PATENT DOCUMENTS

EP  0 710 508 A1  5/1996

(Continued)

*Primary Examiner*—Judy Nguyen
*Assistant Examiner*—Leo T Hinze
(74) *Attorney, Agent, or Firm*—Matthew A. Pequignot; Pequignot + Myers LLC

(57) ABSTRACT

This invention discloses a magnet for use as a printing plate or printing head that is used for aligning flakes or particles in a paint or ink. A composite sheet or block of magnetizable material is selectively magnetized so that a magnet is formed within the sheet or block that has a shape of a predetermined image, logo, or indica. Dies are used to magnetize the magnetizable material and preferably the does contact the material to be magnetized. A pre-magnetized sheet such as a refrigerator magnet may be re-magnetized differently so that a magnetic image is encoded therein for use as a printing plate. Preferably the printing plate is flexible so that it can be formed to a curved surface of a cylinder or drum for printing. Conveniently these flexible magnets can be changed for other designs and placed on the same drum for use in printing.

10 Claims, 8 Drawing Sheets

U.S. PATENT DOCUMENTS

| | | | |
|---|---|---|---|
| 5,364,689 A | 11/1994 | Kashiwagi et al. | 428/195.1 |
| 5,630,877 A | 5/1997 | Kashiwagi et al. | 118/623 |
| 5,949,050 A * | 9/1999 | Fosbenner et al. | 235/449 |
| 6,103,361 A | 8/2000 | Batzar et al. | 428/323 |
| 6,114,018 A | 9/2000 | Phillips et al. | |
| 6,692,830 B2 | 2/2004 | Argoitia et al. | |
| 6,759,097 B2 | 7/2004 | Phillips et al. | 427/510 |
| 6,808,806 B2 | 10/2004 | Phillips et al. | 428/403 |
| 6,818,299 B2 | 11/2004 | Phillips et al. | 428/403 |
| 6,838,166 B2 | 1/2005 | Phillips et al. | 428/323 |
| 6,841,238 B2 | 1/2005 | Argoitia et al. | |
| 7,047,883 B2 | 5/2006 | Raksha et al. | 101/489 |
| 2005/0106367 A1 | 5/2005 | Raksha et al. | 428/199 |
| 2005/0123755 A1 | 6/2005 | Argoitia et al. | 428/402 |
| 2006/0097515 A1 | 5/2006 | Raksha et al. | 283/91 |
| 2006/0194040 A1 | 8/2006 | Raksha et al. | 428/323 |
| 2006/0198998 A1 | 9/2006 | Raksha et al. | 428/323 |

FOREIGN PATENT DOCUMENTS

| | | |
|---|---|---|
| EP | 1 353 197 | 10/2003 |
| EP | 1 493 590 A1 | 1/2005 |
| EP | 1 741 757 | 1/2007 |
| WO | WO 2005/017048 | 2/2005 |
| WO | WO 2006/114289 A | 11/2006 |

* cited by examiner

Prior Art  Prior Art  Prior Art  Prior Art

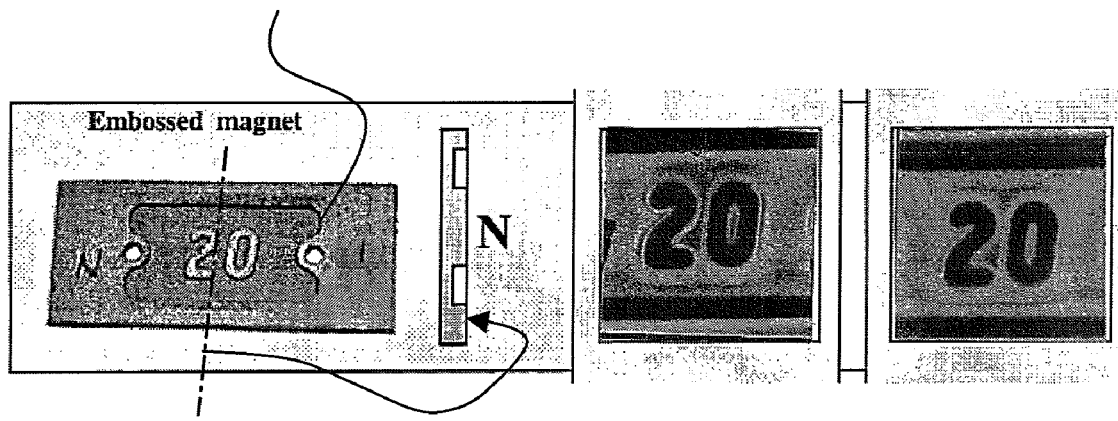
Fig. 2a
Prior Art
Fig. 2b
Prior Art
Fig. 2c
Prior Art
Fig. 2d
Prior Art
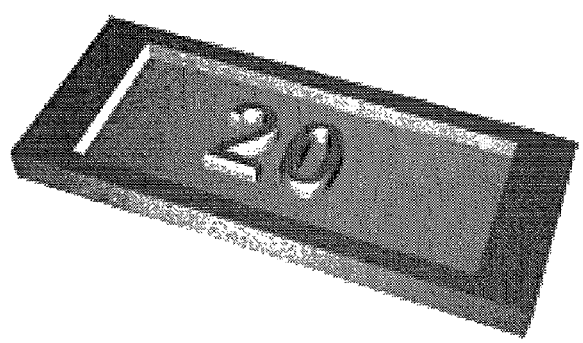
Fig. 2f
Prior Art
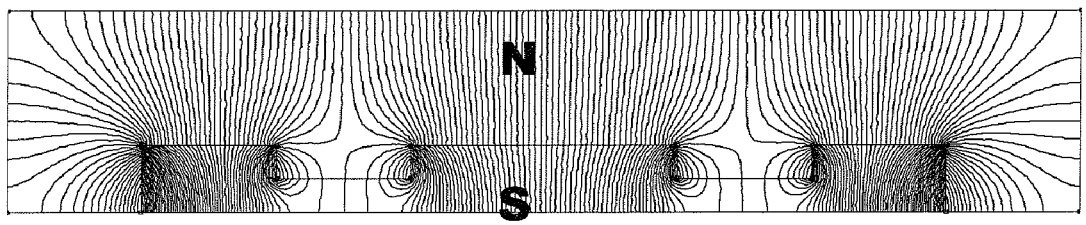
Fig. 2e
Prior Art Fig. 9e   Dies with the shape of the 20 after magnetization of the rubber

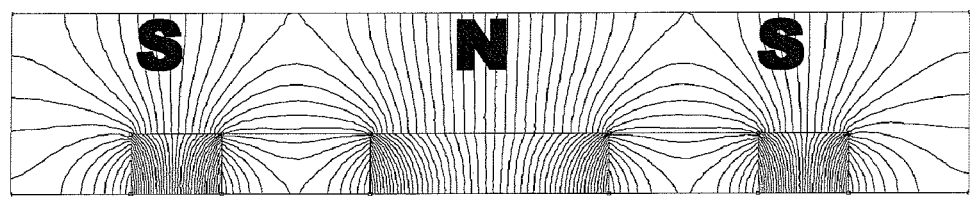
Magnetic field of the magnet with a two-pole orientation
Fig. 10.
Fig. 11
Prior Art
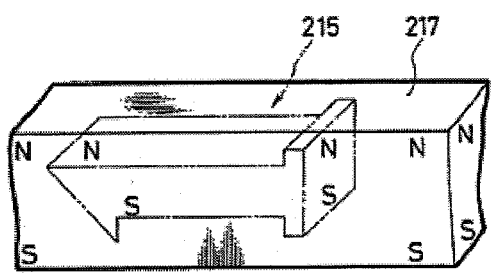

MAGNETIC PLATE FOR PRINTING OF OPTICAL EFFECTS

CROSS-REFERENCE TO RELATED APPLICATIONS

The present invention claims priority from U.S. patent application Ser. No. 60/737,926 filed Nov. 18, 2005, which is incorporated herein by reference for all purposes.

FIELD OF THE INVENTION

This invention relates generally to a magnet for use in printing inks and paints with magnetically alignable particles or flakes, and more particularly relates to forming magnets which have magnetic material aligned in a plurality of different directions in accordance with an applied field and to the use of these magnets as printing plates.

The term "sheet" is used hereafter within this specification to mean a flat thin sheet, and in preferred embodiments as a flexible sheet; however the term sheet is not limited thereto.

The term "plate" used throughout this specification is to mean a stiff or a flexible plate and is to include thin, flat flexible sheet, such as a composite magnetizable sheet or as a rubber magnetic sheet more commonly known when magnetized, as a "fridge" magnet.

The term "printing plate" is used hereafter as a plate that will form an image, indicia or logo within an ink or paint of magnetically alignable flakes. The printing plate does not itself transfer ink or paint, but has the ability to move flakes or particles within a printing ink or paint so as to form a discernible print.

BACKGROUND OF THE INVENTION

All of the patents and applications mentioned hereafter are incorporated by reference for all purposes.

Printing with ink or paint containing magnetic platelets dispersed in liquid ink or paint vehicle is known. In such applications the platelets are magnetically aligned by exposing the ink or paint upon a substrate to a magnetic field. Current examples of such prints are described by Raksha et al in U.S. patent applications 2006/0198998, 2006/0194040, 2006/0097515, 2005/0123755, and 2005/0106367.

U.S. Pat. Nos. 6,808,806, 6,759,097, 6,818,299 and 6,838,166 disclose magnetically alignable flakes and utilizing magnets for aligning flakes in printed images. More particularly U.S. Pat. No. 6,808,806 discloses the use of a flexible magnet having a cut out in a shape of a letter "F" and used for printing. In this embodiment the field emanating from the region surrounding the cut-out "F" was uniform and in a direction normal to the surface of the "F". Flakes that were over the cut-out portion having no field were substantially flat lying. Although this embodiment provides interesting images, this invention provides additional features, not achievable with a magnet having a uniform field.

Painting with magnetic powders was employed in some industries for finishes and decorative coatings. A method for producing a magnetically formed pattern on a product is the subject-matter of U.S. Pat. No. 5,630,877. The product is produced by forming a paint layer from a paint medium mixed with magnetic non-spherical particles, and applying a magnetic field in a shape corresponding to the desired pattern to be formed. The field emanates from magnets mounted underneath the wet painted substrate. After the field aligns the particles, they are cured within the paint vehicle.

U.S. Pat. No. 6,103,361 discloses patterned substrates useful in producing decorative cookware which are formed by coating of a substrate with a base consisting of a mixture of fluoropolymer and magnetic flakes and magnetically inducing an image in the polymer coating composition. The pattern is formed by applying magnetic force through the edges of a magnetizable die positioned under a coated base to induce an image effect.

U.S. Pat. No. 6,759,097 discloses methods and devices for producing images on coated surfaces. The methods comprise applying a layer of magnetizable pigment coating in liquid form on a substrate, applying a magnetic field to selected regions of the pigment coating to alter the orientation of selected magnetic particles or flakes, and solidifying the reoriented particles or flakes in a non-parallel position to the surface of the pigment coating to produce an image such as a three dimensional-like image on the surface of the coating.

The pigment coating can contain various interference or non-interference magnetic particles or flakes, such as magnetic color shifting pigments.

U.S. Pat. No. 3,853,676 claims a pigmented film comprising a film-like material containing magnetic orientable pigment that is oriented in the field.

EP 0 710 508 A1 discloses process for production of layer that exhibits three dimensional effects through alignment of magnetic platelets.

EP 1 493 590 A1 describes a device and a method for transferring a predetermined magnetic design onto document printed with magnetic optically variable ink. The device comprises a body of a composite permanent magnet material, having a surface engraved with the pattern corresponding to the pattern of desirable indicia. The magnetic material is magnetized in the direction perpendicular to the surface. Irregularities in the surface, made with an engraving, produce changes in the direction and strength of the resulting magnetic field. These changes cause different alignment of magnetic particles in different parts of the wet ink that make possible a formation of an image with a shape corresponding to the shape of engraving.

The inventors of this invention have found that printing in accordance with the teachings of EP 1 493 590 A1 has certain limitations. For example when using color-shifting inks, a very poor color-shifting effect resulted. A disappearance of the color-shifting properties of the printed layer occurs with the repositioning of magnetic pigment particles in the layer of a wet ink along lines of magnetic field in the direction substantially perpendicularly to the surface of the document.

Notwithstanding, a color-shifting affect has the best appearance (large color travel and high chroma value) when the particles are parallel or almost parallel to the surface of the substrate. Color-shifting properties by the images printed with the device described in EP 1 493 590 makes utilization of magnetic color-shifting inks for the printing of secure documents essentially useless.

It is an object of this invention to provide a magnet that is more simple to manufacture and offers a high degree in flexibility with regard to the field generated by the magnet.

The magnet does not require costly and difficult carving or removal of material so as to vary the field.

In image of object, logo or indicia is made within the magnetic material of a block or sheet so that the magnet will provide a field that corresponds the object, logo, or indicia when the field is used to align flakes in paint or ink.

The image within the magnetic material is not visible to the eye, but is coded into the magnetic material so as to generate a field that corresponds to the object logo or indicia that is used to "code" the magnetic material.

Advantageously, the object, logo or indicia encoded into the magnet cannot be seen, but is present and generates a magnetic field that aligns flakes placed on a substrate in the field to replicate the object, logo or indicia.

Advantageously a common "fridge" magnet can be encoded with magnetic information so as to change its field direction to form an image.

Advantageously this encoded magnet may be of flexible magnetic material and can be placed on a drum and used to "print" images within a wet inked or painted substrate by aligning particles in a manner that reflect the encoded magnetic information.

As will be described hereafter, prior art methods of applying a magnetic field to inks and or paints that have alignable flakes therein, includes the use of recessed or embossed magnetic regions. In contrast this invention utilizes a magnet having a flat surface wherein magnetic and non-magnetic, or differently magnetized regions are provided within a single monolithic magnet that cause alignment of flakes forming images in a liquid in having field alignable flakes. Advantageously having a flat die or magnetic printing head or plate that is magnetized within eliminates problems associated with making and using 3-D magnetic forms. The flat die can be brought into intimate contact with the substrate and even if pressure is applied the result will be substantially the same. This is not the case with 3-D embossed or engraved magnetic printing plates. As well, boundaries within the printed image can be made sharper with more ease then with embossed or recessed magnetic printing plates.

SUMMARY OF THE INVENTION

In accordance with the invention, there is provided a printing plate comprising: a magnetizable composite material having a plurality of regions along a surface thereof, wherein the magnetizable composite material in one or more first regions is magnetized in a selected manner so that the one or more first regions across a surface of the sheet provide a first magnetic field having a predetermined direction, and wherein magnetic material in one or more other second regions are either unmagnetized or magnetized differently from the one or more first regions so as to provide a contrast in magnetic field, therefrom.

In accordance with another aspect of the invention, there is provided, a method of forming a magnet comprising the steps of:

providing a body of material that is magnetizable;

disposing an outwardly facing magnetically conducting surface of a magnetizing die adjacent to a face of the sheet or block of magnetizable material, and applying a magnetic charge through the magnetizing die to form a magnet within the magnetizable material that conforms to features of the outwardly facing metal surface of the magnetizing die.

In additional embodiments, the invention provides a printing plate wherein:

the composite material is a sheet or block of material.

wherein the one or more first regions are magnetized in the form of a symbol, or discernable indicia;

wherein the one or more second regions are magnetized in a substantially uniform manner so as to allow flakes in a printing ink or paint adjacent to the one or more second regions, lie flat or be upstanding upon a sheet they are coated on;

wherein the sheet is a flexible sheet of composite material.

wherein the composite material is isotropic or anisotropic flexible material including a magnetic powder of Re—Fe—B, within a cured resin binder wherein the sheet of composite material includes a magnetizable material uniformly distributed along and within a working portion of the sheet, wherein a first region of the one or more first regions of the sheet is magnetized in a predetermined manner by application of a magnetic field through the composite material within the first region while excluding applying the magnetic field through some other regions along the sheet such that the first region forms a first magnetic field emanating therefrom that is absent from other regions along the surface of the sheet, or different in intensity or direction from a magnetic field emanating from other regions along the surface of the sheet;

wherein the one or more second regions have a second magnetic field, wherein field lines of the second magnetic field are oriented differently than field lines of the first magnetic field;

wherein the printing plate is for use in aligning field alignable flakes within a liquid or viscous paint or ink and wherein the working portion of the printing plate is used so that the first field aligns flakes upon a substrate covering the first region in a manner such that the flakes align to form indicia in the form of a symbol or discernible graphic, that is seen in contrast to flakes upon the substrate covering the second region of the printing plate;

wherein the first region is magnetized by contacting a surface of the sheet about the first region with a metal die having an outer surface having predetermined shape and having a magnetic charge;

wherein the shape of the metal on the outer surface of the die is imaged within the magnetic material within the composite sheet material;

wherein a magnetic field emanating from the die, is replicated within the first region of the magnetic material;

wherein the outer face of the die has first metal regions that contact the surface of the sheet, and wherein other regions on the outer face of the die are spaced from the surface of the sheet while the first metal regions contact the sheet; and, A printing plate wherein the first metal regions form a symbol, logo, or discernible text or letters.

BRIEF DESCRIPTION OF THE DRAWINGS

Exemplary embodiments of the invention will now be described, in accordance with the drawings, in which:

FIG. 1a is a prior art drawing of an engraved printing magnetic plate having the numeral "20" engraved therein, for use in aligning flakes in an image of the numeral 20.

FIG. 1b is a side cross-sectional view of the magnet shown in FIG. 1a.

FIG. 1c shows an image "20" made by using the printing magnet with field alignable reflective flakes in a carrier of blue ink wherein the background is dark as a result of the particles about the "20" being substantially upstanding.

FIG. 1d shows a similar image to that of FIG. 1c, wherein the background is dark as a result of the particles about the "20" being substantially upstanding.

FIG. 2a is a prior art drawing of an embossed printing magnet having the numeral "20" engraved therein, for use in aligning flakes in an image of the numeral 20.

FIG. 2b is a side cross-sectional view of the magnet shown in FIG. 2 taken along the dashed line in FIG. 2a FIG. 2c shows an image "20" made by using the printing magnet with field alignable reflective flakes is a carrier of blue ink.

FIG. 2d shows a similar image to that of FIG. 2c, wherein the background is dark as a result of the particles about the "20" being substantially upstanding.

FIG. 2e is a cross-sectional drawing of magnetic field emerging from an engraved magnetic sheet for making images such as the ones shown in FIGS. 2c and 2d.

FIG. 2f is a detailed view of an embossed magnetic printing plate similar to the one shown in FIG. 2a.

FIG. 3a is figure of an embodiment of the invention illustrating a metal die and a magnetizable sheet.

FIG. 3b is a side cross-sectional view of the magnet and two dies on two sides of the magnet shown in FIG. 3a.

FIG. 3c shows an image "20" made by using the printing magnet with field alignable reflective flakes is a carrier of blue ink and wherein the background is highly reflective and contrasting against the numeral "20".

FIG. 3d shows a similar image to that of FIG. 3c, wherein the background is bright as a result of many of the particles outside of the region of the "20" being substantially flat.

FIG. 9e is a diagram of a composite sheet rubber magnet after having been magnetized with the two dies having the numeral 20 protruding from end faces thereof.

FIG. 10 is a diagram of the magnetic field from the magnetized sheet having a two-pole orientation used to print the image in FIGS. 9c and 9d.

FIG. 11 is a prior art drawing of a view of a magnetic block for cutting a dye into a shape of a numeral 1.

DETAILED DESCRIPTION OF INVENTION

Figures 1A, 1B, 1C, 1D:
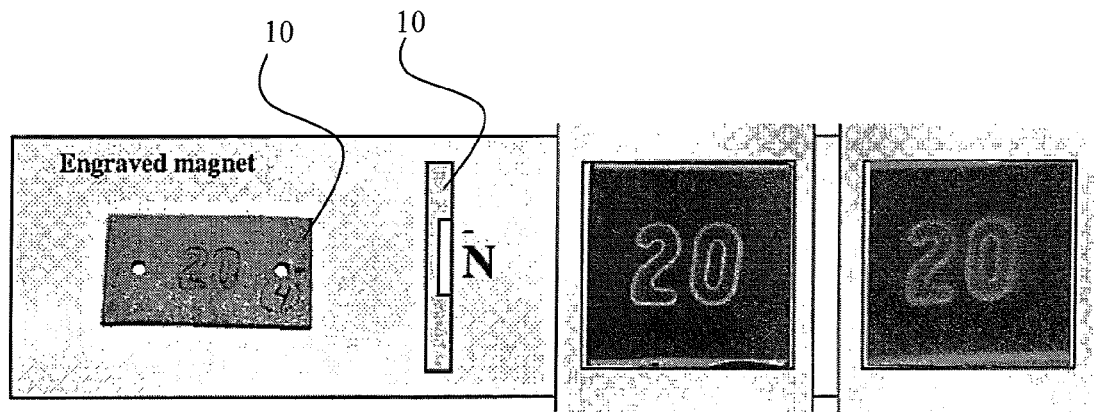

Referring now to prior art FIGS. 1a through 1f, an engraved magnet is shown in FIG. 1a which is used to form a print within a substrate coated with wet ink or paint containing magnetically alignable particles or flakes. After a substrate is coated with the ink or paint the magnet 10 is placed under the substrate and the flakes within the ink or paint align along the field lines forming the numeral 20. In FIG. 1c, reflective flakes, for example Ni, having a silver-like appearance in a blue carrier vehicle are aligned to form the numeral 20. The flakes appear to take on the color of the die and flakes within the background of the "20" and within the numerals themselves have a dark appearance. This is because the flakes are upstanding and all that can be seen is the dark blue carrier vehicle in the spaces between the upstanding flakes. A similar effect is illustrated in FIG. 1d where color shifting flakes are used. The magnetic field in FIG. 1f emanating from the engraved magnet and through the paper substrate is mostly perpendicular to the paper. Hence most of the flakes except along the outline of the "20" would be upstanding. The field lines about the engraving are bent and the flakes align in this bent field to generate the discernible "20". When reflective flakes lay flat along a substrate they tend to reflect light and appear bright. When reflective flakes are upstanding on the substrate they cannot reflect light incident thereon, as it is only their edges which are positioned to reflect, not their flat reflecting surfaces. This is a drawback of this embodiment. Most of the color shifting and reflective flakes in FIGS. 1c and 1d show as a dark background.

Figure 1E:
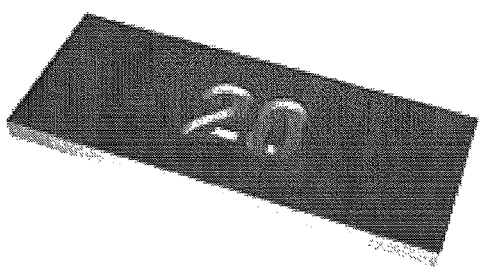
FIG. 1e is a drawing of an engraved magnetic plate in the form of a sheet for making images such as the ones shown in FIGS. 1c and 1d.
Figure 1F:
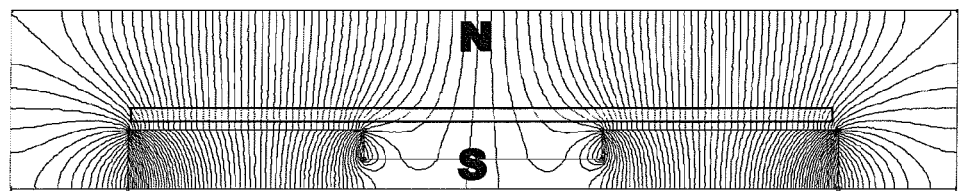
FIG. 1f is a cross-sectional view of magnetic field emerging from engraved magnet shown in FIG. 1e.

Physically engraving a magnet is a costly endeavour and as was mentioned heretofore, control over the magnetic field is limited. For example, in FIGS. 1a through 1d, it can be seen that the field is uniform and upstanding except in the engraved portion. This is often not desirable. Even the engraving of the magnetic sheet shown in FIG. 1e is costly and time consuming to produce. Furthermore, errors cannot be corrected for. Once the material is removed, the removal is permanent.

The printed images formed by using the sheet magnet 20 in prior art FIGS. 2a through 2d are reversed from those in FIGS. 1a through 1d. Rather than the magnetic sheet being engraved, it is embossed around the numeral "20" which appears to protrude from a lower pit within the magnet. Magnetic field simulation in FIG. 2e shows that the lines are vertical in the 20 and in the background area. The lines curve around edges of the pit. As a result, magnetic particles are vertical to the substrate in these particular areas on the top of the 20 as well as dark lines at the bottom and the top of the print. However, the field in the areas of wet ink above the pit is very weak because of the distance between the paper and the top of the magnet in the pit. Such weak field doesn't align the particles and they remain non-oriented inside the layer of wet ink vehicle. The optical effect generated in shows non-uniform bright background and a dark 20.

Figures 3A, 3B, 3C, 3D:
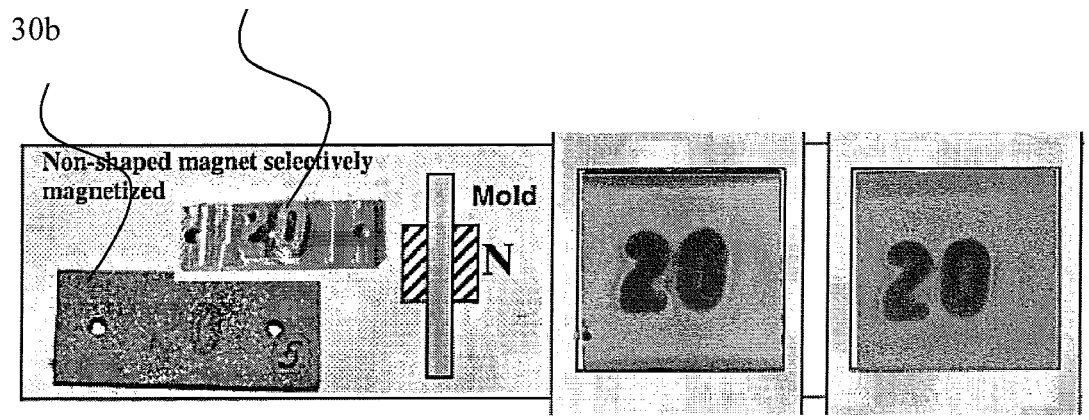
Figure 3E:
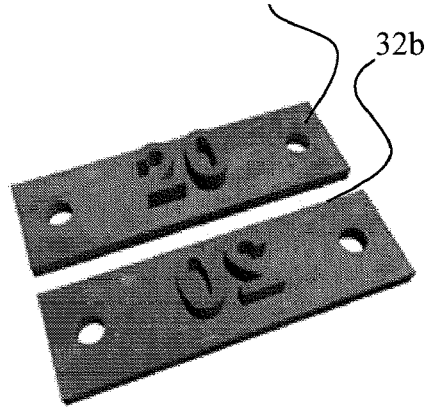
FIG. 3e is a drawing of two dies used for magnetizing the magnetizable sheet shown in FIG. 3a so that the magnetized sheet can be used to form images such as the ones shown in FIGS. 3c and 3d.
Figure 3F:
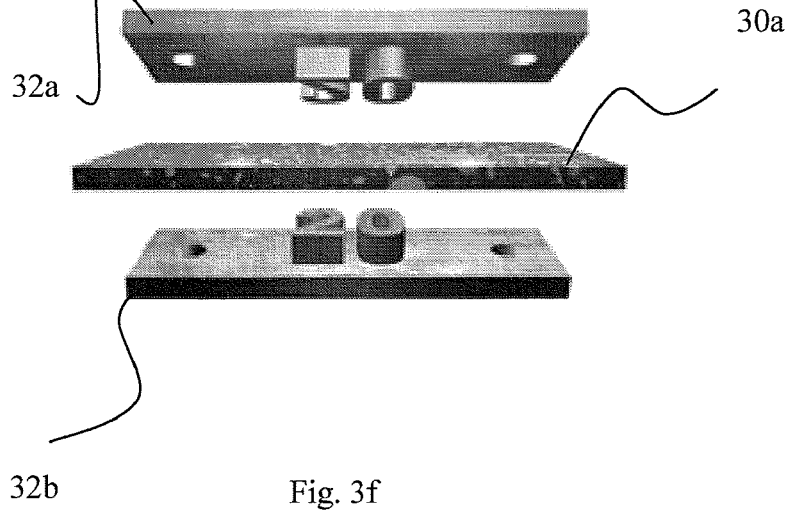
FIG. 3f is a drawing of a pair of dies placed on either side of a magnetic sheet material ready for magnetizing, wherein the electronics required to charge the dies are not shown in this figure.

Embodiments of this invention are shown in FIGS. 3a through 3d. These are believed to be significant improvements over the magnets and samples shown in FIGS. 1a through 2d. In FIG. 3a a magnet 30b is shown wherein a magnetic charge confined to a region having the shape of the numeral 20 has been transferred from a die 32a into the magnet 30b forming a magnet within a region confined to the shape of the numeral 20, formed within the magnetic material itself. Two dies 32a and 32b made of mild steel were fabricated so that one die 32a, has a protruding number 20 and another has mirrored image of the numeral 20. Both dies were brought to contact with the non-magnetized sheet 30a disposed therebetween as shown in FIG. 3f. The sheet 30a is a non-magnetized flexible flat magnetic composite, capable of being magnetized if exposed to a strong magnetic field or charge.

In FIG. 3f the dies 32a, 32b, are shown in position with the flexible magnetic composite 30a before magnetization has been applied.

Figure 4:
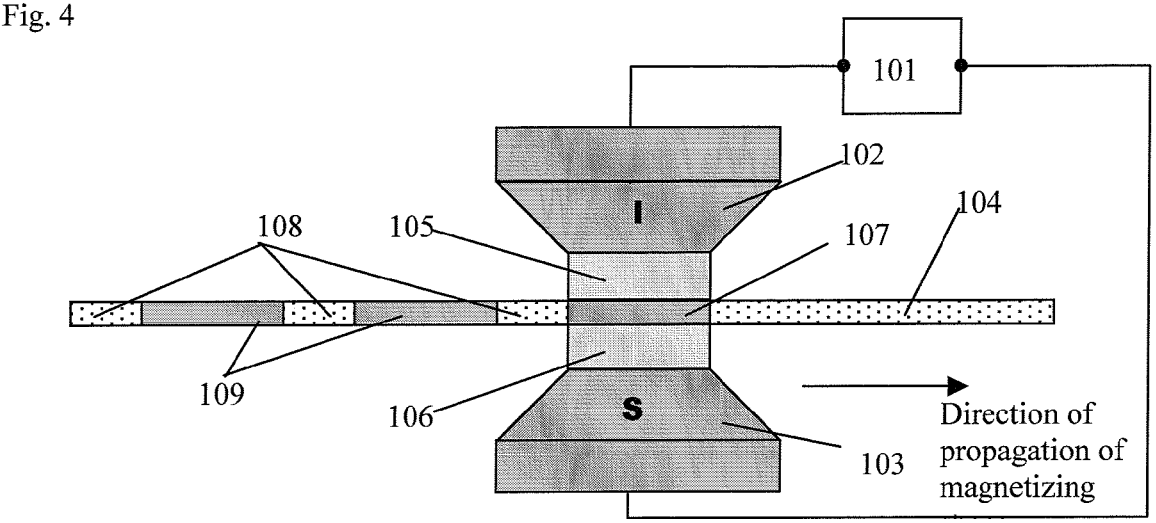
FIG. 4 is schematic diagram of a two-pole magnetization station where a sheet of magnetizable material is magnetized at predetermined locations along the sheet having unmagnetized regions between magnetized regions.

Turning now to FIG. 4 magnetized areas are shown, a linear array of magnetic regions 109 are shown on the plate or sheet 104. Each magnetic region has an internal magnetic structure of a shape corresponding to the shape of the dies 105, 106 contacting the sheet 104. Magnetization of the regions can be conducted either by two-pole magnetizer as shown in FIG. 4 or one-pole magnetizer shown in FIGS. 5 and 6. The north and south shoes 102 and 103 of magnetizer 101 may move in XY coordinates along the sheet of non-magnetized flexible material 104 as well as up and down. Alternatively, the sheet 104 may move between the shoes of the magnet. Relative movement is required in this embodiment between the flexible material 104 and the shoes 102, 103. Alternatively, the magnetic poles could function in a manner like a reciprocating hot stamp process where the sheet 104 is momentarily stopped and the dies 105 and 106 are lightly pressed against the sheet 104 and then removed after a approximately one second. The shaped dies 105 and 106 are fabricated from a soft magnetic material. The die 106 is mirrored to the die 105, in a same manner as dies 32a and 32b of FIG. 3. The dies are attached to the shoes and can be brought to contact with the flexible magnet by adjustment of the distance between the shoes 102, 103. In the process of magnetization of the plate 104, the shoes with the dies move along the plate to the place that needs to be magnetized and the shoes with the dies are brought to the dense contact with each other through the plate 104. The power of the magnetizer 101 is switched on to create a magnetic field between the dies. The generated field magnetizes the plate 104 in the region 107 with a magnetization direction perpendicular to the surface of the plate. The typical time of such a single magnetization process is close to 1 second. The shape of the magnetized area 107 has the shape of the die. After completion of magnetization of a particular region, the shoes spread apart and move to another position on the plate, leaving a non-magnetized space 108 between the magnetized areas 109. In most instances, the die has a relief structure that contacts the plate, i.e. the numeral "20". Engraved regions of the die provide closer or further distance between the source of a magnetic field and the plate. This allows for the creation of a magnetization with gradient magnetic fields through the plate.

Figure 5:
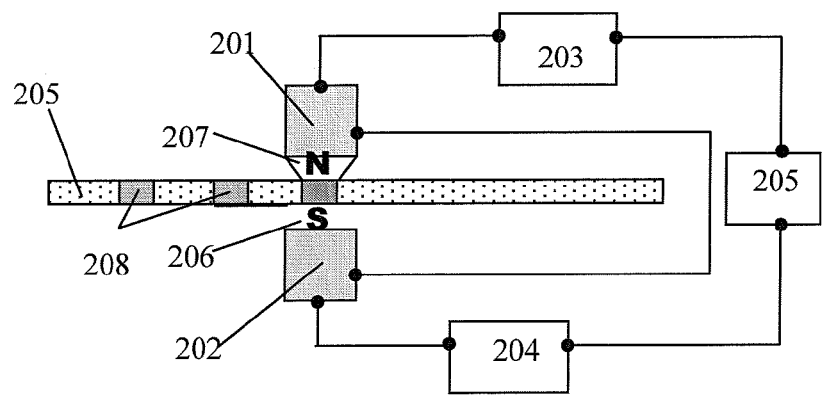
FIG. 5 is an alternative embodiment of a magnetization station having a one-pole magnetizer for magnetizing a sheet of magnetizable material.

Instead of the two-pole magnetizer shown in FIG. 4, two one-pole electromagnets as are shown in FIG. 5 can provide the same magnetization effect.

Turning to FIG. 5, series aiding electromagnets 201 and 202 are connected in the circuit to the power supplies 203 and 204 and to the computer 205 which provides positioning of the magnets along the plate 206 and their turning on and off. The shaped dies 206 and 207 are attached to the bottom of the magnet 201 and the top of the magnet 202. The magnets 201 and 202 are aligned on both sides of the plate 203 with their axis coincident. The magnets move in X-Y coordinates along the plate 205. In the place that needs to be magnetized, the magnets come toward each other so close that they are separated only by the thickness of the plate 205. The power turns on and the magnets generate magnetic field that in one second magnetizes selective area of the plate. After completion of the process, the magnets move to another position leaving magnetized areas 208

Figure 6:
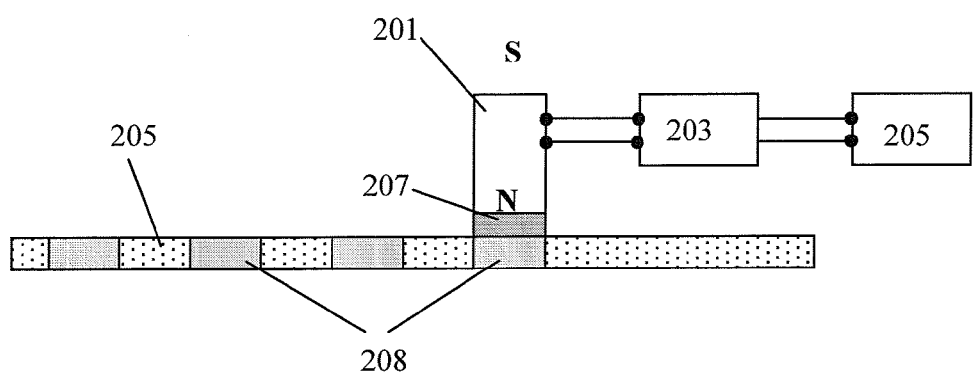
FIG. 6 is an alternative embodiment of a magnetization station having a single die for magnetizing a sheet of magnetizable material.

A one-pole magnet can also magnetize the plate. A layout of such system is shown in FIG. 6 where an electromagnet 201 is connected with the power supply 203 and the computer 205. Substrate 205 has magnetized regions 208 repeating the shape of the die 207.

Figure 7:
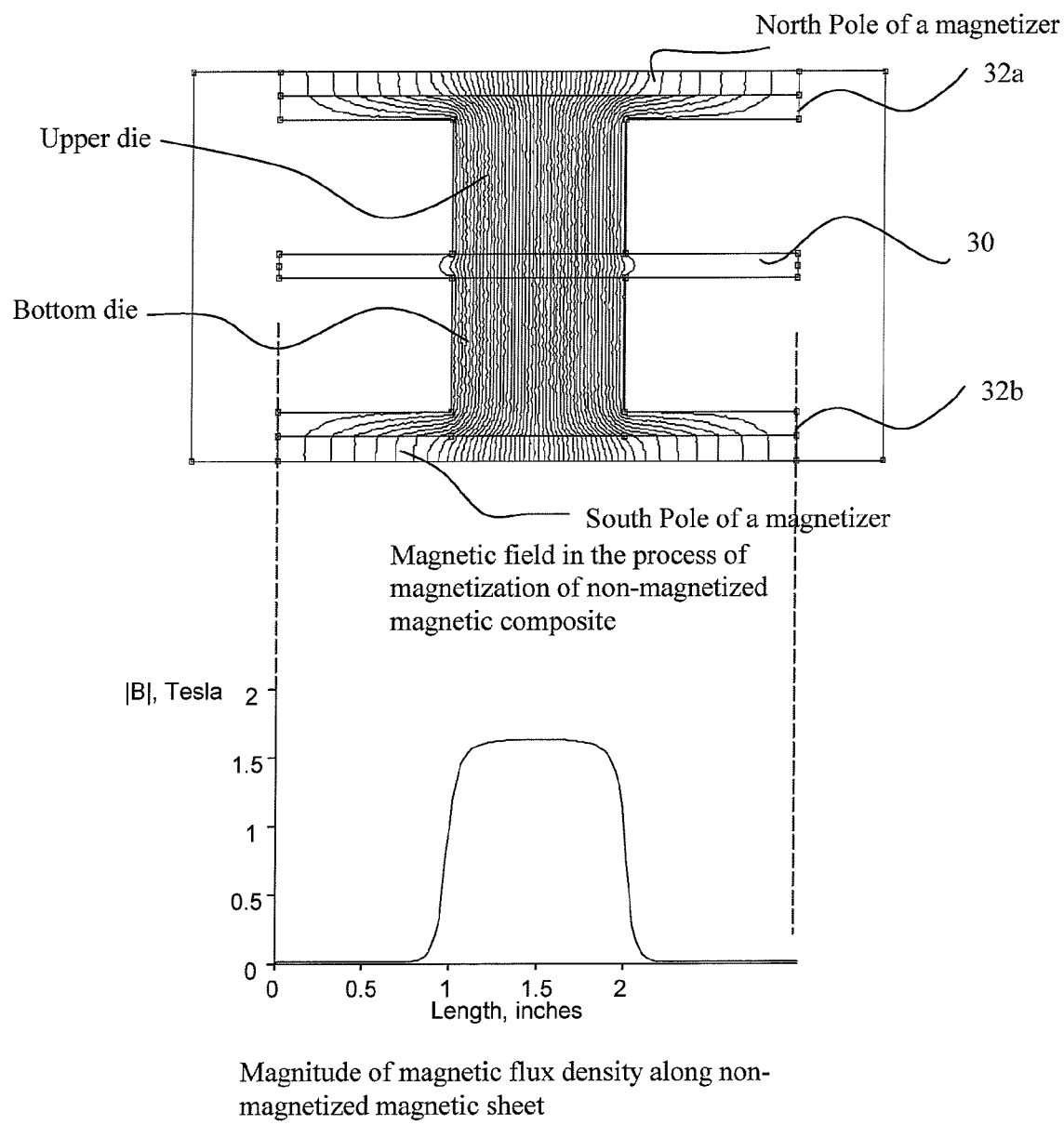
FIG. 7 is a diagram illustrating the magnetic field lines propagating through the dies and through the sheet magnetizable material and further illustrating the magnitude of magnetic flux density along the magnetizable sheet.

Referring once again to FIGS. 3 and 4 where a north and south pole magnetizer are provided having a flat magnetizable material sandwiched therebetween, FIG. 7 shows a simulation of a computer simulation of a magnetic field through such structure, placed inside of a magnetic charger (magnetizer), is shown in the picture "Magnetic field in the process of magnetization of non-magnetized magnetic composite". It is clear from the picture that the field flows into and through the dies that serve as magneto-conductors and flows mostly through the region of the flat magnetic material that is enclosed between the dies without substantial charging surrounding regions of the flat sheet. The magnitude of magnetic flux density along entire sheet shown in the lower part of the figure.

Figure 8:
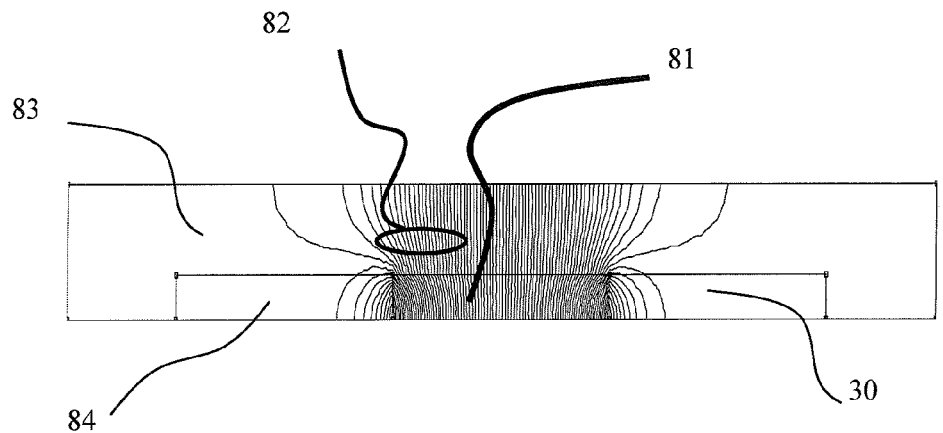
FIG. 8 is a drawing illustrating the magnetic field lines propagating from the sheet where it is magnetized and illustrating the absence of a field in regions about the magnetized region.

FIG. 8 illustrates the field emanating from the sheet 30 made in FIG. 7 with the metal shoes or dies of FIG. 3f. When a substrate with wet ink containing magnetic particles placed on a substrate on the top of the magnet 30 with the numeral "20" selectively magnetized in the sheet of magnetic rubber, the background is bright and smooth and the 20 is dark and highly visible. This is highly advantageous of the prior art workpieces shown heretofore made with embossed or engraved magnets. The magnetized part of the sheet 81 is shown with mostly vertical field lines. Magnetic lines 82 emanating from the sheet within the air space 83 above the magnet 30. A non-magnetized part of the sheet 84 is shown absent of field lines.

Figures 9A, 9B, 9C, 9D:
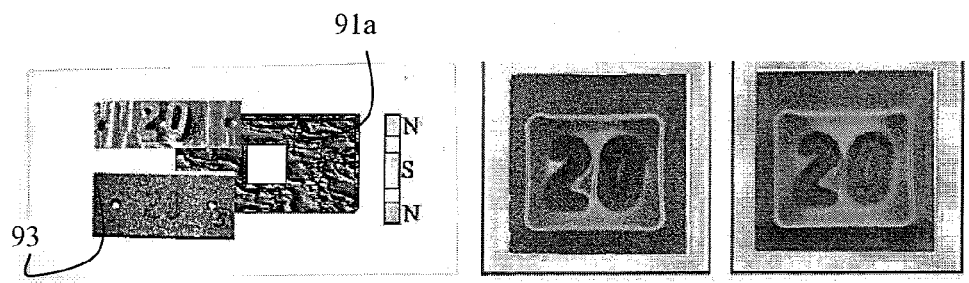
FIG. 9a is drawing illustrating two dissimilar magnetic dies and a magnetizable sheet for use in printing images in inks and paint.
FIG. 9b is a cross-sectional view.
FIGS. 9c and 9d are images printed using the magnetized sheet of FIG. 9a and using the two dissimilar dies to magnetize the sheet.
Figure 9F:
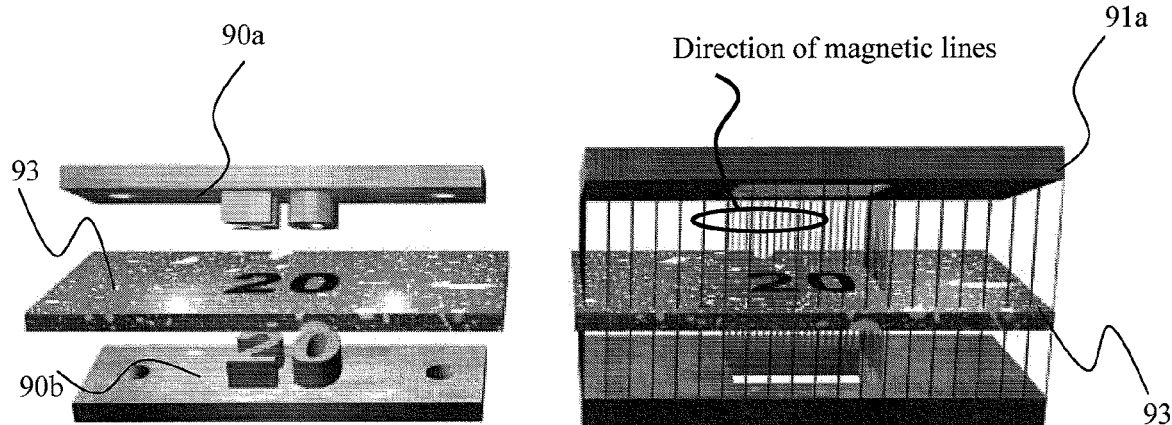
FIG. 9f is a drawing showing selective magnetization of the magnetized sheet of FIG. 9e.

Referring now to FIGS. 9a through 9f an alternate configuration and printing method is shown whereby a two-step process is applied. In FIG. 9a a sheet magnet 93 is shown having the numeral 20 magnetically encoded therein. A magnetized sheet 91a is shown which will be utilized after aligning flakes with the sheet magnet 93. The resulting images are shown in FIGS. 9c and 9d. The two steps of the process are shown more clearly in FIGS. 9e and 9f. In FIG. 9e the dies 90a and 90b with the embossed numerals 20 are used to magnetize the sheet with the encoding of the numeral 20. Subsequently the same magnetic sheet is magnetized by two magnets 91a and 91b. The resulting magnetized sheet magnet was used to align flakes in both of the samples shown in FIGS. 9c and 9d. For ease of understanding and simplicity the magnetic charge source is not shown connected to 90a, 90b or 91a or 91b although this is required. Alternatively one could use very strong permanent magnets in the form of 90a, 90b, 91a, and 91b to magnetize the sheet 93.

FIG. 10 illustrates the magnetic field within the magnetized sheet 93 wherein the magnet within the sheet has a two-pole orientation.

Figure 12:
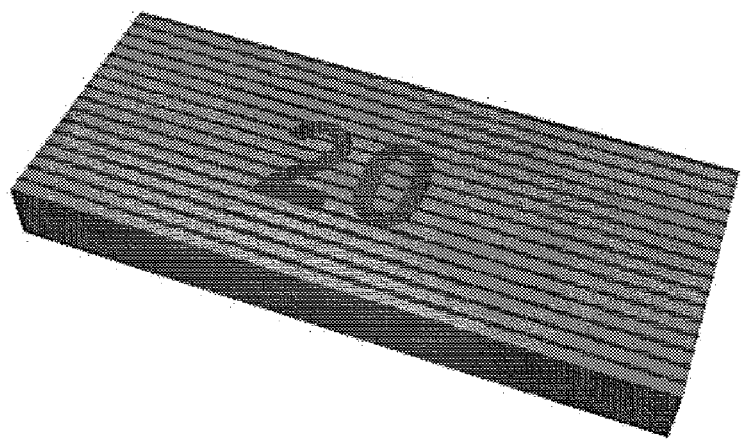
FIG. 12 is a re-magnetized sheet magnet.
Figure 13:
FIG. 13 is an image formed with the re-magnetized sheet magnet of FIG. 12.

FIG. 12 is an alternative embodiment of the invention wherein a "fridge magnet" or pre-magnetized magnet is re-magnetized is a desired region. Although the image of the 20 and the lines of magnetization cannot actually be seen, FIG. 12 is a representation of where the magnet is within the block or sheet shown. FIG. 13 is a drawing of an image printed with the magnet shown in FIG. 10. The lines of magnetization shown within the "fridge" magnet are duplicated in the image of FIG. 13 as the flakes in the image are aligned along the field lines.

The numeral 20 magnetized into the fridge magnet can be done with very strong permanent magnets or by inducing a magnetic charge through one or more dies. It should be noted that "fridge" magnets are generally magnetized having spaced rows of magnets are within the same monolithic magnetic block or sheet. As was shown these magnets can be re-magnetized such that they become encoded magnetically with indicia such as numerals or letters or logos, or images.

In contrast, prior art FIG. 11 illustrates the complex task of producing a numeral "1" form a solid magnetic block. In this instance a die must be cut from the solid block. If the die is incorrectly cut, or if the magnet is not handled carefully it can break or crack.

In contrast the magnet formed within the flexible magnet is quite robust and easy to manufacture. The magnetic shape is created with a magnetic field, and the magnet is flexible.

Of course numerous other embodiments can be envisaged without departing from the spirit and scope of the invention.

In embodiments described heretofore, printing has been described wherein a magnetic sheet or block is used for align magnetically alignable flakes. It should be understood that flakes of various kinds may be used; for example reflective flakes, multilayer flakes, color shifting flakes, diffractive flakes, flakes having covert features therein, highly absorbing flakes and any other form of flakes that can be aligned in a magnetic field.

The invention claimed is:

1. A method of forming a reusable magnetic printing plate comprising the steps of:
   a) providing a monolithic sheet or block of magnetizable material;
   b) providing a shaped magnetizing die having an outer surface in the form of an image, logo, or indicia;
   c) disposing the outer surface of the shaped magnetizing die adjacent to a surface of the sheet or block of magnetizable material; and
   d) applying a magnetic field through the shaped magnetizing die to form a magnet in a form corresponding to the image, logo, or indicia within the sheet or block of magnetizable material, wherein the magnetic field emanating from the outer surface of the shaped magnetizing die is in the form of the image, logo, or indicia and is substantially uniform in intensity and direction.

2. A method as defined in claim 1, wherein step (c) includes the step of contacting the outer surface of the shaped magnetizing die with the surface of the sheet or block of magnetizable material.

3. A method as defined in claim 2, wherein the outer surface of the shaped magnetizing die is non-planar, and wherein step (c) includes the step of contacting an outermost portion of the non-planar outer surface of the shaped magnetizing die with the surface of the sheet or block of magnetizable material.

4. A method as defined in claim 2, wherein step (b) includes the step of providing a second shaped magnetizing die having an outer surface in the form of a mirror image of the image, logo, or indicia, and wherein step (c) includes the step of simultaneously contacting the outer surface of the second shaped magnetizing die with an opposite surface of the sheet or block of magnetizable material.

5. A method as defined in claim 1, wherein the magnet formed within the sheet or block of magnetizable material provides a magnetic field in a form corresponding to the image, logo, or indicia.

6. A method as defined in claim 5, wherein the magnet formed within the sheet or block of magnetizable material provides a magnetic field that will align field alignable flakes upon a substrate in a form corresponding to the image, logo, or indicia.

7. A method as defined in claim 1, wherein the magnetic field emanating from the outer surface of the shaped magnetizing die is in a direction substantially perpendicular to the surface of the sheet or block of magnetizable material.

8. A method as defined in claim 1, wherein the shaped magnetizing die consists of a monolithic body of a soft magnetic material.

9. A method as defined in claim 1, further comprising the step of moving the sheet or block of magnetizable material relative to the shaped magnetizing die and subsequently repeating steps (c) and (d).

10. A method of forming a flexible magnetic printing plate comprising the steps of:
    providing a magnetized sheet having more than 40% of magnetic field lines aligned in a same direction;
    providing a shaped magnetizing die having a non-planar outer metal surface defining an image, logo, or indicia; and
    contacting an outermost portion of the non-planar outer metal surface with a region of the magnetized sheet, while applying a magnetic field through the shaped magnetizing die and into the region of the magnetized sheet to change a magnetic field within the region, wherein the magnetic field emanating from the non-planar outer metal surface is in the form of the image, logo, or indicia and is substantially uniform in intensity and direction, and wherein the region is in a form corresponding to the image, logo, or indicia.

* * * * *